United States Patent [19]
Kobelt

[11] 3,815,471
[45] June 11, 1974

[54] SELF-ADJUSTING LINEAR ACTUATOR

[76] Inventor: Jack R. Kobelt, 6110 Oak St., 13 Vancouver, British Columbia, Canada

[22] Filed: Mar. 30, 1972

[21] Appl. No.: 239,427

[52] U.S. Cl.............. 91/189, 91/401, 92/130, 188/196 A
[51] Int. Cl............................................ F15b 11/18
[58] Field of Search ............... 91/189; 60/54.5 S; 188/196 A, 196 B

[56] References Cited
UNITED STATES PATENTS

| 1,430,359 | 9/1922 | Canion | 91/189 |
| 2,638,750 | 5/1953 | Hettinger, Jr. | 91/189 |
| 2,675,678 | 4/1954 | English | 91/189 |
| 2,747,700 | 5/1956 | Daly | 188/196 B |
| 2,752,012 | 6/1956 | Moorhead | 188/196 B |

FOREIGN PATENTS OR APPLICATIONS

| 1,226,477 | 2/1960 | France | 188/196 B |

*Primary Examiner*—Paul E. Maslousky

[57] ABSTRACT

This disclosure pertains to a novel linear actuator comprising a cylinder portion, a piston portion, and a rod portion. Self-adjusting means interconnecting the piston portion and rod portion is adapted, in response to cyclical movement of the piston portion along a linear stroke of fixed length inside the cylinder portion, to automatically increase the length of the rod portion with respect to the piston portion and cylinder portion. This length self-adjusting capability permits the use of mechanical or pneumatic springs to actuate the piston portion in a short stroke of fixed length whereas the rod portion will automatically extend to compensate for an increasing linear actuator length requirement. An example of where my subject invention may be used is a friction brake where cycling of the brake will automatically cause the linear actuator rod portion to increase in length so as to compensate for friction material wear.

11 Claims, 4 Drawing Figures

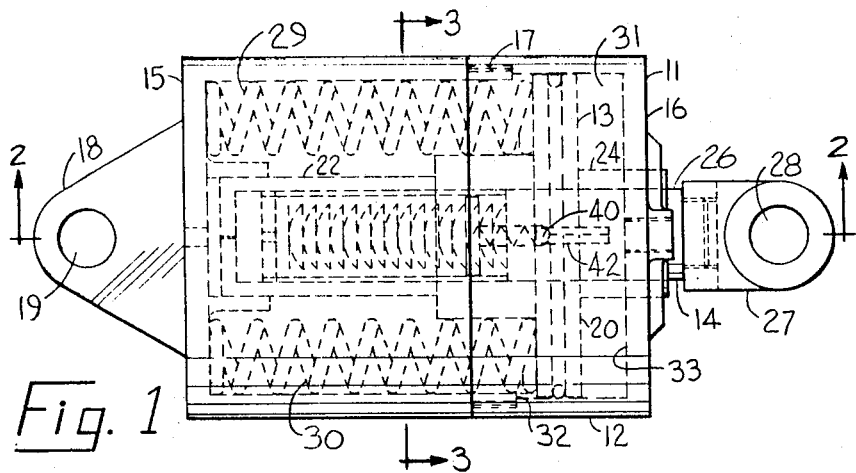
Fig. 1
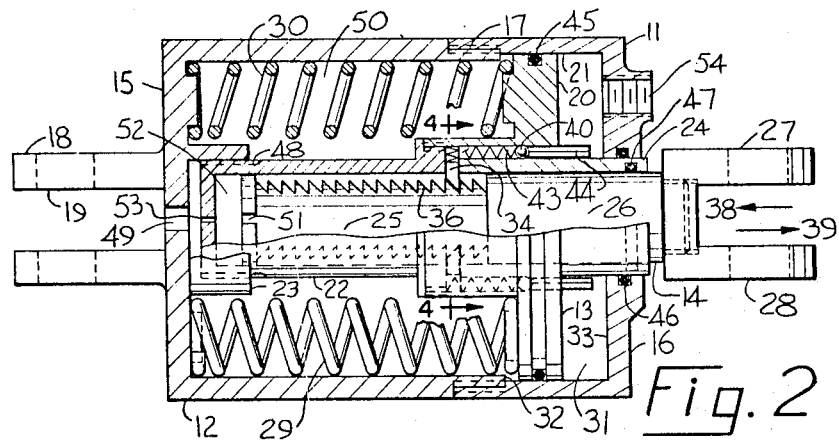
Fig. 2
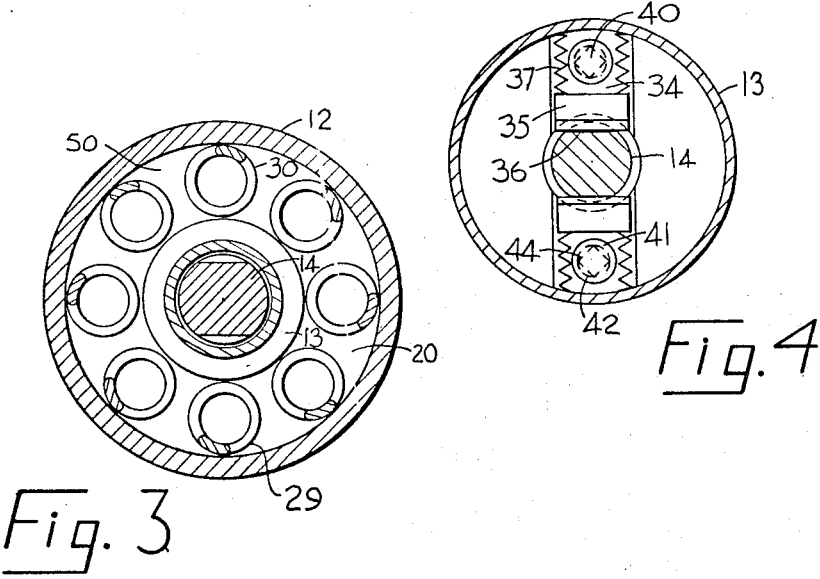
Fig. 3
Fig. 4

SELF-ADJUSTING LINEAR ACTUATOR

This invention relates to novel improvements in devices which are known in the art to which they pertain as linear actuators, or to devices such as hydraulic and pneumatic actuators which are of the general character of linear actuators. In their simplest form, linear actuators comprise a cylinder portion, a piston portion and a rod portion. Fluid power is normally used to move the rod and piston portions with respect to the cylinder portion. An element interconnected to the rod portion may thus be actuated or moved with respect to an element interconnected to the cylinder portion.

For purposes of fail-safe reliability, mechanical compression springs are preferred in the actuation of devices such as automotive brakes, fluid power being used to de-energize the brakes. In this case, the effective stroke of the spring is quite short in terms of friction material wear and frequent manual adjustment of the actuator mechanism is required to maintain the brake operative. My present invention is directed toward the utilization of the cyclical actuation of devices, such as automative brakes, to self-adjust the operative length of a linear actuator in which springs are employed to provide fail-safe actuation in one direction.

Therefore it is one object of this my invention to provide a linear actuator wherein cyclical actuation self-adjusts the operative length of the linear actuator.

It is another object of my invention to provide a linear actuator wherein a linear actuator of fixed piston stroke in a cycling application can be used where the operative stroke gradually increases over a large number of cycles.

It is a further object of this invention to provide a linear actuator wherein a fail-safe spring actuated piston stroke of fixed length can be used to actuate without manual adjustment cycling devices requiring a gradually increasing linear actuator length.

It is yet another object of this invention to provide a linear actuator wherein a short spring actuated stroke can be used to actuate a brake mechanism and wherein cycling of the brake will self-adjust the operative length of the linear actuator to accommodate wear of the brake friction material.

It is still another object of this invention to provide a linear actuator wherein mechanical springs may be used singly or in plurality to provide a range of actuation forces in a linear actuator of fixed dimensions.

Still further objects and advantages of the present invention reside in the details of construction of the embodiment of the invention disclosed herein.

These and further objects of the invention will be evident from a study of the following disclosure and accompanying drawings which illustrate improved details of construction of a preferred embodiment of my invention. This embodiment is merely exemplary and is not intended to detract from the full scope of the invention as set out in the annexed claims.

In the drawings, wherein like numerals refer to like parts:

FIG. 1 is a plan view of a self-adjusting linear actuator in accordance with the present invention;

FIG. 2 is a partial sectional elevation of the self-adjusting linear actuator taken substantially along line 2—2 in FIG. 1;

FIG. 3 is a sectional view of the self-adjusting linear actuator taken substantially along line 3—3 in FIG. 1;

FIG. 4 is a partial sectional view of the piston portion and rod portion of a self-adjusting linear actuator taken substantially along line 4—4 in FIG. 2.

Turning now to the drawings, FIGS. 1 and 2 illustrate a self-adjusting linear actuator 11 comprising cylinder portion 12, piston portion 13, and rod portion 14. Cylinder portion 12 comprises mounting end 15 and rod end 16 interconnected for assembly purposes by thread means 17. Mounting end 15 is provided with integral clevis 18 having pin holes 19. Piston portion 13 comprises a piston element 20 slidably guided by the inner circumferential surface 21 of cylinder portion 12, a first guide portion 22 extending toward cylinder mounting end 15 and slidably guided therein by sleeve 23, and a second guide portion 24 extending through cylinder rod end 16 and slidably guided therein. Rod portion 14 comprises piston end 25 slidably mounted in first guide portion 22 and mounting end 26 extending through second guide portion 24 beyond rod end 16 of cylinder portion 12. Rod end 26 is provided with clevis 27 having pin holes 28.

Spring means 29 in spring chamber 50 comprising a plurality of mechanical compression springs 30 force piston 20 toward cylinder rod end 16. Fluid actuating chamber 31 is formed between piston 20 and cylinder rod end 16. Piston 20 is limited in its movement toward cylinder mounting end 15 by shoulder 32 and in its movement toward cylinder rod end 16 by cylinder internal end surface 33.

Piston end 25 of rod portion 14 is of cross-sectional area smaller than the internal cross-sectional area of first guide portion 22. Piston portion 13 and rod portion 14 are interconnected by dog means generally denoted by numeral 34. Dog means 34 comprises wedge-shaped element 35 slidably mounted in piston portion 13 and engaged in similarly wedge-shaped notches 36 in rod portion 14. Dog springs 37 hold element 35 in one of notches 36 thus preventing movement of rod portion 14 with respect to piston portion 13 in direction 38. Element 35 is forced out of one of notches 36 by movement of rod portion 14 with respect to piston portion 13 in direction 39; if such movement is greater than the pitch length of one notch, elemnt 35 will engage in another of notches 36.

With reference now to FIGS. 2 and 4, valve means 40 comprises ball 41, seated in a passage 42 of cross-sectional area less than that of ball 41 and held in place by valve spring 43, and valve member 44 of cross-sectional area less than that of passage 42 resting against ball 41 and extending into fluid actuating chamber 31. When piston 20 approaches rod end 16 of cylinder 12, valve member 44 contacts surface 33, thereupon forcing ball 41 back against valve spring 43 and opening valve means 40. In the embodiment illustrated in the FIGURES, passage 42 is of circular cross-section whereas valve member 44 is of a square cross-section whose diagonal is substantially equal to the diameter of passage 42.

Dynamic sealing means 45 and 46 are provided between the slidably mating surfaces of piston portion 13 and cylinder portion 12, and dynamic sealing means 47 between the slidably mating surfaces of piston portion 13 and rod portion 14. Groove 48 and breather hole 49 in piston first guide portion 22 are provided to relieve fluid pressures developing in spring means chamber 50 due to movement of piston portion 13 with respect to cylinder portion 12. Groove 51 is provided in piston end 25 of rod portion 14 to permit fluid flow behind rod end 25 into rod actuating chamber 52. Bleeder hole 53 is provided in the back of first guide means 22 to gradually relieve fluid pressures developed in chamber 52.

Looking now at the operation of my invention, referenced to FIG. 2, consider self-adjusting linear actuator 11 to be interconnecting elements of an actuated device in which the actuating stroke in any cycle is limited by an engaged position and a relaxed position of piston 20 with respect to cylinder 12. The engaged position of piston 20 is determined by spring means 29 and operatively will be substantially short of piston 20 bottoming out upon cylinder surface 33. The relaxed position of piston 20 is determined by fluid flow of sufficient pressure and volume through orifice 54 into chamber 31 such that spring means 29 are compressed and piston 20 ultimately rests upon shoulder 32 of cylinder 12.

Consider now that, whereas the required actuating stroke in any cycle is short, the distance between the elements to which linear actuator 11 is interconnected gradually increases over many cycles, such as is the case in a friction brake wherein the actuating stroke in any cycle is very short but the wearing away of friction material over many brake applications changes the operative location or limits of the actuating stroke with respect to the actuator. In such a case, my invention permits the employment of the cycling of the linear actuator automatically to adjust the operative length of the linear actuator while the actuator stroke for any given cycle remains substantially the same. Further, my invention permits the use of a spring means of low spring rate ($1b$/in) under substantial initial deflection to provide a moderate variance of spring force over a short actuator stroke.

A complete cycle of the self-adjusting linear actuator may be considered by commencing with fluid in chamber 31 such that spring means 29 are compressed and piston 20 rests on shoulder 32. Valve member 44 is clear of cylinder surface 33, ball 41 is seated, valve means 40 is closed, dog member 35 is engaged in one of notches 36 and rod portion 14 is in a relaxed position with respect to cylinder 12. To permit spring means 29 to move rod 14 in direction 39 to an engaged position, fluid is released from chamber 31 through orifice 54. Piston 20 moves toward surface 33 and valve member 44 may or may not contact surface 33, depending upon the operative actuating stroke requirement of the actuated device.

If valve member 44 does not contact surface 33, valve means 40 remains closed and dog means 34 maintains its existing relationship between piston 13 and rod 14. To return rod 14 and piston 13 to the original relaxed position, fluid flow of sufficient pressure and volume to overcome the force of spring means 29 is reintroduced into chamber 31 through orifice 54. Clearly, no self adjustment of the operative length of linear actuator 11 is achieved in such a cycle. On the other hand, if valve member 44 does contact surface 33, ball 41 is unseated, valve means 40 is opened, fluid flows into the space between rod 14 and piston first guide portion 22 and flows through groove 51 into rod actuating chamber 52. If the release of fluid through orifice 54 is sufficiently gradual and the engaged position is a substantially greater distance than the pitch length of one of grooves 36 away from the position of rod 14 at the time valve means 40 is opened, then the fluid pressure in chamber 52 will move rod 14 with respect to piston 13 such that dog member 35 will be lodged in another of notches 36, and the operative length of linear actuator 11 will be increased by the pitch length of at least one of notches 36. If cycle timing does not permit self-adjustment in the way must described, then when rod 14 and piston 13 are returned to their original relaxed position by reintroducing fluid into chamber 31, valve means 40 already being open, fluid will flow into chamber 52 thereby holding rod 14 in the engaged position while piston 13 moves in direction 38. If in this case the length of movement of piston 13 in direction 38 is greater than the length of one of notches 36, then self-adjustment of rod 14 with respect to piston 13 will have been achieved.

In any linear actuator cycle when valve means 40 is opened and fluid flows into chamber 52, whether it be a self-adjusting cycle or not, as piston element 20 returns to its relaxed position upon shoulder 32 valve member 44 breaks contact with surface 33, thus permitting spring 43 to close valve means 40. Fluid pressure in chamber 52 is then gradually relieved through bleeder hole 49 and breather hole 53. The friction force of dog means 34 on rod 14 in direction 38 then carries rod portion 14 and piston portion 13 to their relaxed position.

From the foregoing description, it should be evident that the actuating stroke of piston 13 with respect to cylinder 12 will vary, during that number of linear actuator cycles which comprises one self-adjusting cycle, substantially from the stroke length requirement of an actuated device to a greater length equal to that stroke plus the pitch length of one of notches 36. Furthermore, over many linear actuator cycles, during which linear actuator 11 is operative, the number of self-adjusting cycles will equal the number of notches 36 and the operative length of linear actuator 11 will increase from its original length to that length plus the number of notches 36 times the pitch length of one of notches 36.

When linear actuator 11 has exhausted the number of self-adjusting cycles available, such as is the case in a brake where the brake shoes must be relined, one of the pins interconnecting the linear actuator to its actuated device may be removed and rod portion 14 rotated approximately 90° with respect to piston portion 13. Dog member 35 will thereupon be forced out of notch 36 and rod 14 can be returned manually to its original position. In like manner, rod 14 may be moved in direction 39 to take up unwanted slack prior to commencement of operation of an actuated device, such as is the case in a brake where the brake shoes have just been relined and the brake is about to return to service.

It will be appreciated that the foregoing discloses only a preferred embodiment of my present invention. Further, many changes, modifications, and equivalents will readily occur to one skilled in the art, particularly in view of the above teachings. For instance, dog means 34 may comprise member 35 slidably mounted in rod 14, notches 36 being provided in first guide means 22.

Second guide means 24 need not extend through rod end 16 of cylinder 12. Spring means 29 may be a pneumatic spring. Piston 13 may include a diaphragm interconnecting piston 13 to cylinder 12. Spring means 29 may be mechanical tension springs located inside chamber 31. Spring means 29 may be a plurality of mechanical springs arranged coaxially or side-by-side about rod portion 14. Therefore, the present invention is not to be construed as limited to the specific details illustrated and described above.

The embodiments of the invention in which an exclusive property or privilege is claimed are defined as follows:

1. A self-adjusting linear actuator comprising a cylinder portion having a mounting end and a rod end, a piston portion slidably mounted within said cylinder portion and including a first guide portion, a rod portion having a piston end slidably mounted in said first guide portion and a mounting end extending beyond said rod end of said cylinder portion, spring means interposed between one end of said cylinder portion and one side of said piston portion, a fluid actuating chamber formed between the internal boundaries of the other end of said cylinder portion and the other side of side piston portion, valve means in said piston portion actuated by movement of said piston portion with respect to said cylinder portion, a bleeder hole in said first guide portion, dog means interconnecting said rod portion and said piston portion, fluid in said fluid actuating chamber flowing to an additional chamber formed by the first guide portion and piston end and located adjacent the cylinder mounting end, and imposing a force on said piston end of said rod portion when said valve means is opened, said force effecting a change in linear position of said rod portion with respect to said piston portion.

2. Apparatus as defined in claim 1 wherein said piston portion includes a second guide portion slidably mounted in said rod end of said cylinder portion.

3. Apparatus as defined in claim 1 wherein said rod portion passes through said second guide portion, said second guide portion guiding said rod portion throughout said change in linear position of said rod portion with respect to said piston portion.

4. Apparatus as defined in claim 1 wherein said dog means comprises a wedge-shaped element slidably mounted in said piston portion, a dog spring interposed between said piston portion and said wedge-shaped element, a plurality of wedge-shaped notches in said piston end of said rod portion, said wedge-shaped element forced into one of said wedge-shaped notches by said dog spring and forced out of said one of said wedge-shaped notches by said rod portion undergoing said change in linear position of said rod portion with respect to said piston portion.

5. Apparatus as defined in claim 4, said piston end of said rod portion rotatably mounted in said piston portion, rotation of said rod portions about a pivotal axis substantially perpendicular to said wedge-shaped notches dislodging said dog means from said wedge-shaped notches, said rod portion thus becoming movable slidably with respect to said piston portion.

6. Apparatus as defined in claim 1 wherein said valve means comprises a ball seated and held in said piston portion by a valve spring means, a passage of cross-sectional area smaller than that of said ball interconnecting said ball with said fluid actuating chamber, a valve member of cross-sectional area smaller than that of said passage slidably mounted in said passage and extending into said fluid actuating chamber, one end of said valve member unseating said ball and opening said valve means when the other end of said valve member interacts with one end of said cylinder portion.

7. Apparatus as defined in claim 1, wherein said spring means comprises a plurality of mechanical compression springs mounted substantially co-axial with said rod portion.

8. Apparatus as defined in claim 1, wherein said spring means comprises a plurality of mechanical compression springs mounted in side-by-side relation to one another circumferentially about said rod portion.

9. Apparatus as defined in claim 1, wherein said piston portion includes a diaphragm member interconnecting said piston portion with said cylinder portion.

10. A self-adjusting linear actuator comprising a cylinder portion having a mounting end and a rod end, a piston portion slidably mounted within said cylinder portion and having a first guide portion, a rod portion having a piston end slidably mounted in said first guide portion and a mounting end slidably mounted in said rod end of said cylinder portion, spring means interposed between said mounting end of said cylinder portion and one side of said piston portion, a fluid actuating chamber formed between the other side of said piston portion and the internal boundaries of said rod end of said cylinder portion, valve means mounted in said piston portion and including a valve actuating member extending into said fluid actuating chamber, said valve actuating member being actuated by movement of said piston portion with respect to said cylinder portion, a bleeder hole in said first guide portion, dog means interconnecting said rod portion and said piston portion, fluid in said fluid actuating chamber flowing to an additional chamber formed by the first guide portion and piston end and located adjacent the cylinder mounting end, imposing a force on said piston end of said rod portion when said valve means is opened by said valve actuating member, said force effecting a change in linear position of said rod portion with respect to said piston portion, said dog means maintaining step-wise said change in linear position of said rod portion with respect to said piston portion.

11. A self-adjusting linear actuator comprising a cylinder having a mounting end and a rod end, a piston having a guide means slidably mounted in said mounting end, a rod having a piston end slidably and rotatably mounted in said guide means and an actuating end slidably and rotatably mounted in said rod end, spring means interposed between said mounting end and one side of said piston, a first fluid actuating chamber formed between the other side of said piston and the internal boundaries of said rod end, a second fluid actuating chamber formed between said piston end and said guide means, valve means mounted in said piston and including a valve actuating member extending into said first fluid actuating chamber, said valve actuating member being actuated by movement of said piston with respect to said cylinder, a bleeder hole in said second fluid actuating chamber, dog means operatively mounted in said piston and operatively engaging one of a plurality of notches on said piston end, fluid from said first fluid actuating chamber flowing into said second fluid actuating chamber and imposing a force on said piston end when said valve means is opened by said valve actuating member, said force effecting a change in linear position in one direction of said rod with respect to said piston, said dog means maintaining stepwise said change in linear position of said rod with respect to said piston, rotation of said rod with respect to said piston disengaging said dog means from said one of said plurality of notches whereby said rod becomes slidably movable in the other direction with respect to said piston.

* * * * *